(12) United States Patent
Kusano

(10) Patent No.: US 6,290,310 B1
(45) Date of Patent: Sep. 18, 2001

(54) BRAKE PRESSURE CONTROL DEVICE FOR AUTOMOTIVE VEHICLES

(75) Inventor: Akihito Kusano, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/580,431

(22) Filed: May 30, 2000

(30) Foreign Application Priority Data

May 28, 1999 (JP) .................................................. 11-149795

(51) Int. Cl.[7] ...................................................... B60T 8/88
(52) U.S. Cl. ................................. 303/122.11; 303/113.4
(58) Field of Search .............................. 303/122.11, 121, 303/122.02, 122.03, 122.04, 122.05, 113.4, 122.1; 703/6, 7, 8, 18

(56) References Cited

U.S. PATENT DOCUMENTS

| | | | |
|---|---|---|---|
| 5,941,608 | * 8/1999 | Campau et al. | 303/113.4 |
| 6,079,793 | * 6/2000 | Takayama et al. | 303/14 |
| 6,206,484 | * 3/2001 | Ganzel | 303/113.4 |

FOREIGN PATENT DOCUMENTS

| | | |
|---|---|---|
| 58-39551 | 3/1983 | (JP) . |
| 63-64858 | 3/1988 | (JP) . |

\* cited by examiner

Primary Examiner—Robert J. Oberleitner
Assistant Examiner—Pamela J. Rodriguez
(74) Attorney, Agent, or Firm—Burns, Doane, Swecker & Mathis, LLP

(57) ABSTRACT

To apply hydraulic pressure to a wheel brake upon failure of a stroke simulator, a brake pressure control device for automotive vehicles is designed so that when a power pressure source is in the normal condition, fluid communication between the master cylinder and the wheel brake is interrupted and fluid communication between the master cylinder and the stroke simulator is established, thus causing the output hydraulic pressure of the power pressure source to be adjusted in response to a detection output of a master cylinder hydraulic pressure sensor, thereby applying the resulting hydraulic pressure to the wheel brake. In addition, the brake pressure control device is provided with a stroke sensor which detects a stroke of a brake pedal. When the stroke of the brake pedal exceeds a predetermined stroke, a simulator cut-off valve is closed to interrupt fluid communication between the master cylinder and the stroke simulator.

9 Claims, 5 Drawing Sheets

— Normal Condition

—— Upon Failure of Simulator in First Example

——— Upon Failure of Simulator in Prior Art

— Normal Condition

—— Upon Failure of First Pressure Chamber of Master Cylinder in First Example

——— Upon Failure of First Pressure Chamber of Master Cylinder in Prior Art

BRAKE PRESSURE CONTROL DEVICE FOR AUTOMOTIVE VEHICLES

This application is based on and claims priority under 35 U.S.C. § 119 with respect to Japanese Application No. 11(1999)-149795 filed on May 28, 1999, the entire content of which is incorporated herein by reference.

FIELD OF THE INVENTION

The present invention is generally directed to vehicle brake systems. More particularly, the present invention pertains to a brake pressure control device for an automotive vehicle which regulates the brake pressure of a wheel brake in such a manner that while the wheel brake is isolated from a master cylinder and the master cylinder is in fluid communication with a pedal stroke simulator, hydraulic pressure outputted from another hydraulic pressure generating device other than the master cylinder is utilized.

BACKGROUND OF THE INVENTION

A known type of brake pressure control device is disclosed in, for example, Japanese Patent Laid-Open Publication No. Sho. 63-64858 published in 1978 without examination. In this known brake pressure control device, a 4-port/2-position electric changeover valve is located between the wheel brake and the master cylinder. The changeover valve is positionable in a first position and a second position. When the changeover valve is in the first position, the wheel brake is brought into fluid communication with the master cylinder such that the wheel brake is isolated from a power pressure source made up of a pump, a pressure accumulator, and other elements. When the changeover valve is in the second position, the wheel brake is brought into fluid communication with the power pressure source such that the wheel brake is isolated from the master cylinder and the master cylinder is brought into fluid communication with an absorbing device or stroke simulator.

The brake pressure control device is also equipped with a depression force sensor which detects the force applied to the brake pedal when the brake pedal is depressed. When the power pressure source is in a normal condition, if the changeover valve is switched from the first position to the second position, the hydraulic pressure outputted from the power pressure source to adjust the hydraulic pressure of the wheel brake becomes responsive to the depression amount of the brake pedal. In contrast, when the power pressure source experiences a failure, the changeover valve is switched from the second position to the first position to establish a direct application of the hydraulic pressure to the wheel brake from the master cylinder.

With the foregoing structure, although the absorbing device or stroke simulator is made up of a piston, a spring, and other elements, the absorbing device has to be provided with a seal member for preventing leakage of the brake fluid. In the event of a breakage of the seal member causing the absorbing device to fail, the changeover valve causes the master cylinder to connect to the absorbing device and disconnect from the wheel brake. Under the resulting condition, if the hydraulic pressure of the wheel brake is intended to be adjusted by using the brake pedal, the brake pedal is advanced through a distance which corresponds to the axial length of a pressure chamber of the master cylinder despite an increase in the depression force applied to the brake pedal. As a result, it becomes impossible to apply the hydraulic pressure to the wheel brake as rapidly as possible.

In light of the foregoing, a need exists for a brake pressure control device for automotive vehicles that is capable of applying brake pressure to the wheel brake as rapidly as possible upon failure of the stroke simulator.

SUMMARY OF THE INVENTION

According to one aspect of the invention, a brake pressure control device for automotive vehicles includes a wheel brake associated with a wheel of the automotive vehicle for applying a braking force to the wheel, a master cylinder linked with a brake pedal, a power pressure source separate from the master cylinder for generating a hydraulic pressure; a hydraulic pressure control valve disposed between the power pressure source and the wheel brake to adjust the hydraulic pressure of the wheel brake by using the hydraulic pressure generated by the power pressure source; a first open/close valve which establishes and interrupts fluid communication between the master cylinder and the wheel brake, a stroke simulator connected to the master cylinder and permitting a stroke of the brake pedal when the first open/close valve is closed, a second open/close valve which establishes and interrupts fluid communication between the master cylinder and the stroke simulator, a brake operation force detector that detects the operation force of the brake pedal or the hydraulic pressure generated by the master cylinder and a stroke detector detects the stroke of the brake pedal or a stroke of the master cylinder. A control device controls the hydraulic pressure control valve in response to the detection output of the brake operation force detector by closing and opening the first open/close valve and the second open/close valve, respectively, when the power pressure source is in the normal condition. The control device closes the second open/close valve when the stroke of the brake pedal or the stroke of the master cylinder exceeds a predetermined stroke.

In addition, when the stroke of the brake pedal or the stroke of the master cylinder exceeds a predetermined stroke, the second open/close valve is closed to interrupt fluid communication between the master cylinder and the stroke simulator, thus causing the output of the brake operation force detector to increase rapidly upon failure of the stroke simulator, with the result that the wheel brake can be applied with the hydraulic pressure as rapidly as possible.

The present invention also involves configuring the control device to close the second open/close valve when the stroke of the brake pedal or the stroke of the master cylinder exceeds a predetermined stroke and the operation force of the brake pedal or the hydraulic pressure generated by the master cylinder does not exceed a predetermined value. It is thus possible to reliably detect an abnormal condition such as a failure of the stroke simulator.

Also in accordance with the present invention, the brake pressure control device is designed so that the control device closes the second open/close valve when the operation force of the brake pedal or the hydraulic pressure generated by the master cylinder relative to the stroke of the brake pedal or the stroke of the master cylinder, respectively, does not exceed a predetermined function. This also makes it possible to reliably detect an abnormal condition such as a failure of the stroke simulator.

Another aspect of the present invention involves a brake pressure control device for automotive vehicles that includes a wheel brake associated with a wheel of the automotive vehicle for applying a braking force to the wheel, a master cylinder linked with a brake pedal, a power pressure source separated from the master cylinder to generate hydraulic pressure, a hydraulic pressure control valve disposed between the power pressure source and the wheel brake to adjust hydraulic pressure of the wheel brake by using the hydraulic pressure generated by the power pressure source, a stroke simulator connected to the master cylinder, a brake operation force detection device for detecting an operation force of the brake pedal or a hydraulic pressure generated by the master cylinder, and a stroke detector for detecting the stroke of the brake pedal or the stroke of the master cylinder. The hydraulic pressure control valve is controlled in response to a detection output of the brake operation force detection device by interrupting the fluid communication between the master cylinder and the wheel brake and establishing fluid communication between the master cylinder and the stroke simulator when the power pressure source is in the normal condition. Fluid communication between the master cylinder and the stroke simulator is also interrupted when the stroke of the brake pedal or the stroke of the master cylinder exceeds a predetermined stroke.

In accordance with the present invention, when the stroke of the brake pedal or the stroke of the master cylinder exceeds a predetermined stroke, fluid communication between the master cylinder and the stroke simulator is interrupted, thus causing the output of the brake operation force detection device to increase rapidly upon failure of the stroke simulator. The wheel brake can thus be applied with the hydraulic pressure as rapidly as possible.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

Figure 8:
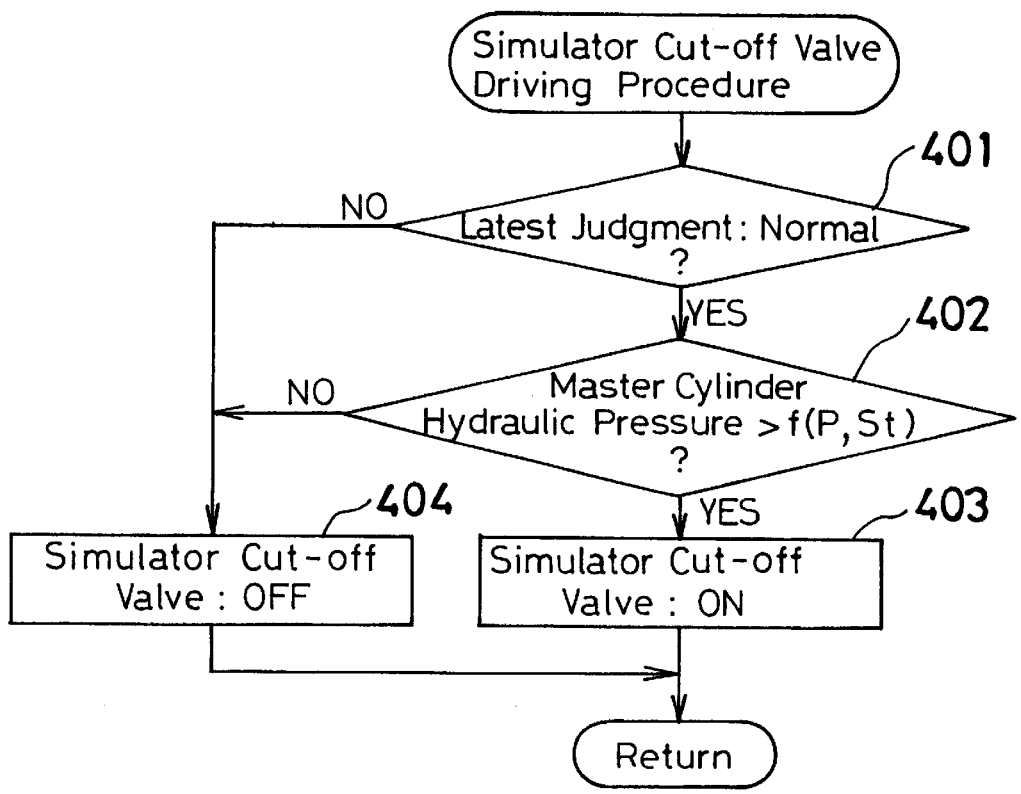
Figure 9:
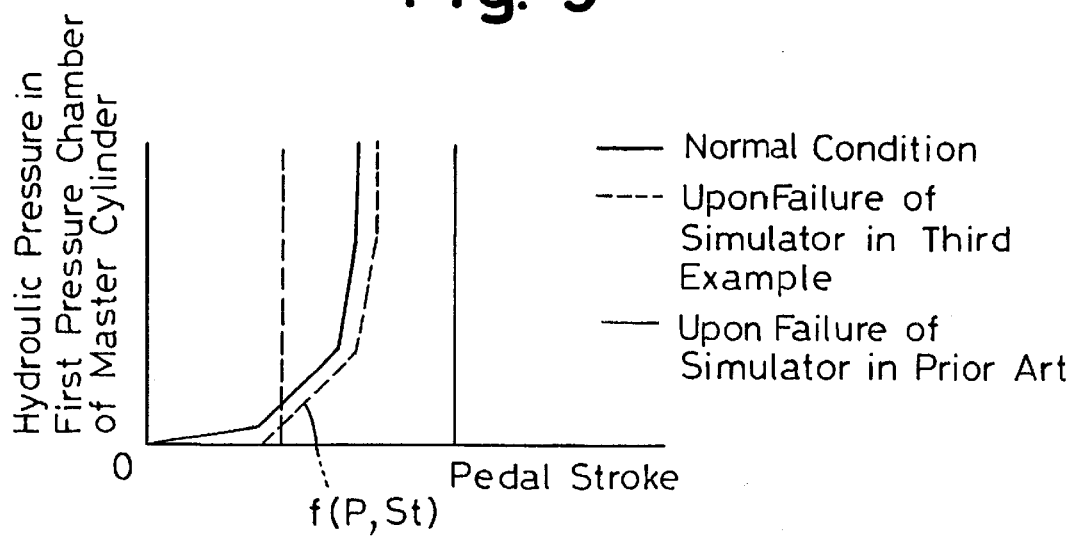

FIG. 8 is a flowchart illustrating the program for controlling a third embodiment or example of a simulator cut-off valve driving procedure; and FIG. 9 is a graph illustrating the relationship between the brake pedal stroke and hydraulic pressure in the first pressure chamber of the master cylinder when the simulator is in the normal condition and when the simulator is in failure in both the third example or embodiment of the present invention as well as in the known system of the prior art.

DETAILED DESCRIPTION OF THE PREFERRED EMBODIMENTS

Figure 1:
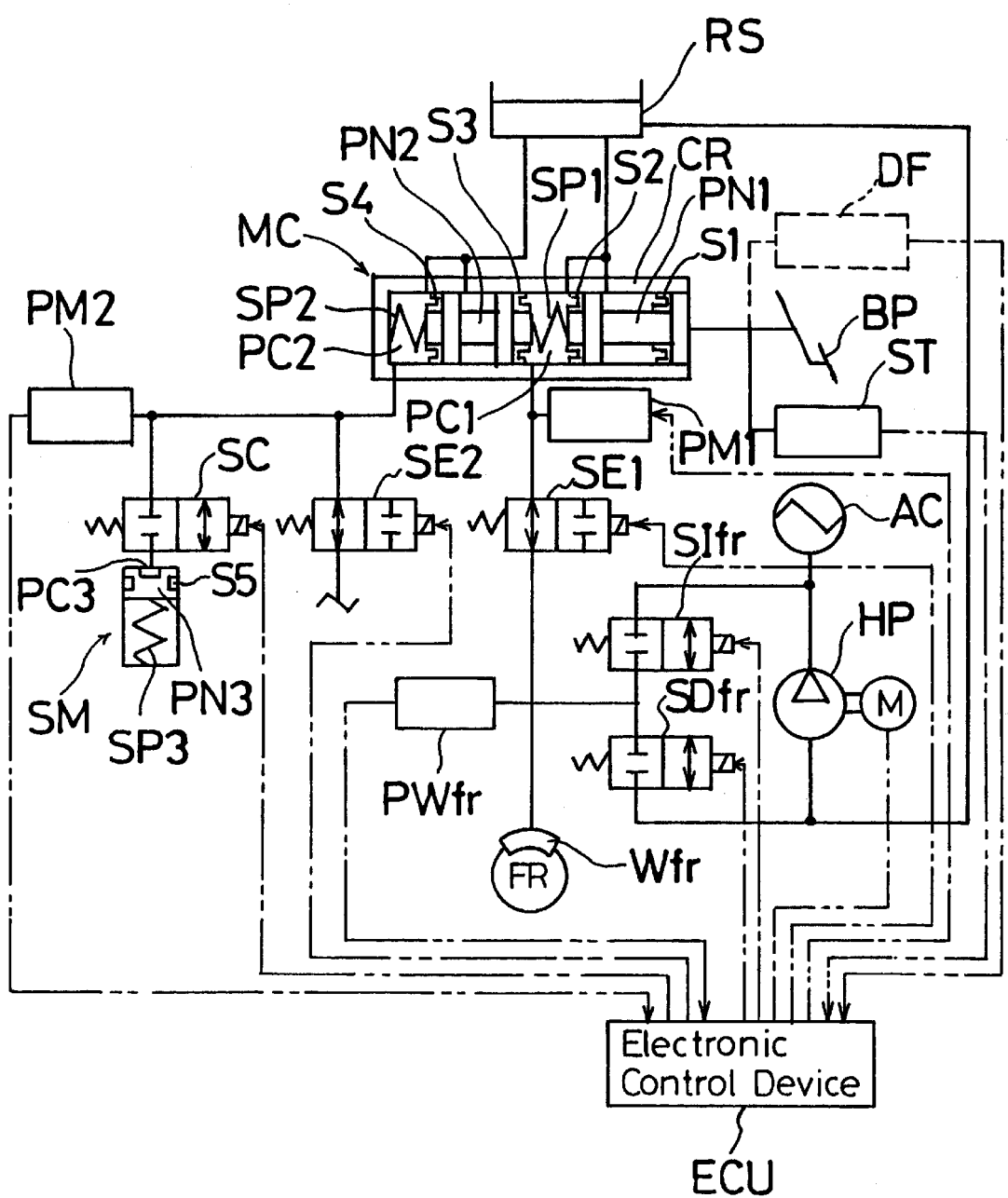
FIG. 1 is a schematic illustration of a hydraulic brake pressure control device for an automotive vehicle in accordance with the present invention.

FIG. 1 schematically illustrates a brake pressure control device for an automotive vehicle in which the hydraulic pressure line for a front-right wheel FR is depicted. As illustrated in FIG. 1, the front-right wheel FR is equipped with a wheel brake Wfr which applies a braking force to the wheel FR. The wheel brake Wfr is connected to an accumulator AC by way of a normally closed linear solenoid valve for pressure increase (hereinafter referred to as pressure increasing valve) SIfr and is also connected to a master cylinder reservoir RS by way of a normally closed linear solenoid valve for pressure decrease (hereinafter referred to as pressure decreasing valve) SDfr. The accumulator AC is connected to the master cylinder reservoir RS by way of a hydraulic pressure pump HP which is driven by an electric motor M. The hydraulic pressure pump HP draws brake fluid stored in the master cylinder reservoir RS, pressurizes the brake fluid to a predetermined value, and feeds the resulting or pressurized brake fluid to the accumulator AC. The accumulator AC stores the pressurized brake fluid. The pressure increasing valve SIfr is used to adjust the hydraulic pressure applied from the accumulator AC to the wheel brake Wfr, while the pressure decreasing valve SDfr is used to adjust the hydraulic pressure drained from the wheel Wfr to the master cylinder reservoir RS.

The hydraulic pressure pump HP, the accumulator AC, and the electric motor M constitute a power pressure source or a hydraulic pressure generating device which is different from another hydraulic pressure generating device which generates hydraulic pressure independent of depression of the brake pedal BP.

The wheel brake Wfr is capable of being connected to a tandem master cylinder MC comprised of a cylinder CR in which is positioned a first piston PN1 and a second piston PN2. The first piston PN1 is slidably fitted in the cylinder CR and defines a first pressure generating chamber (hereinafter referred to as the first pressure chamber) PC1 at the front side of the first piston PN1 in the cylinder CR. The first piston PN1 is linked to the brake pedal BP and is urged by a return spring SP1 toward the brake pedal BP in a direction to increase the volume of the first pressure chamber PC1. In a normal condition under which the brake pedal BP is at rest (i.e., is not depressed), the first pressure chamber PC1 is in fluid communication with the master cylinder reservoir RS. This fluid communication is interrupted when the first piston PN1 moves through a predetermined distance as a result of depression of the brake pedal BP. The first pressure chamber PC1 is isolated in a fluid-tight manner from other portions or chambers in the master cylinder MC by way of seal members S2, S3.

The second piston PN2 is also slidably fitted in the cylinder CR and defines a second pressure generating chamber (hereinafter referred to as the second pressure chamber) PC2 at the front side of the second piston PN2 in the cylinder CR. The first pressure chamber PC1 is thus located at the rear side of the second piston PN2. The second piston PN2 is urged by a return spring SP2 toward the first pressure chamber PC1 in a direction to increase the volume of the second pressure chamber PC2. Like the first pressure chamber PC1, the second pressure chamber PC2 is in fluid communication with the master cylinder reservoir RS in the normal condition under which the brake pedal BP is at rest (i.e., is not depressed). This fluid communication is interrupted when the second piston PN2 moves through a predetermined distance as a result of depression of the brake pedal BP. The first pressure chamber PC2 is in fluid-tight isolation from other portions or chambers in the master cylinder MC by way of a seal member S4. A seal member S1 mounted on the first piston PN 1 establishes a fluid-tight contact between the inner periphery of the opening of the cylinder CR and the first piston PN1.

A normally open 2-port/2-position master cylinder cut-off solenoid valve (hereinafter referred to as the master cut-off valve) SE1 is interposed between the first pressure chamber PC1 and the wheel brake Wfr for the front-right wheel FR to establish and interrupt fluid communication between the first pressure chamber PC1 and the wheel brake Wfr. The second pressure chamber PC2 is in fluid communication with a wheel brake such as a wheel for a front-left wheel by way of a normally open 2-port/2-position master cylinder cut-off solenoid valve (hereinafter referred to as the master cut-off valve) SE2. The master cut-off valve SE2 establishes and interrupts fluid communication between the second pressure chamber PC2 and the wheel brake such as the wheel brake for the front-left wheel (not shown).

The second pressure chamber PC2 is connected to a stroke simulator SM by way of a normally closed type 2-port/2-position simulator cut-off solenoid valve (hereinafter referred to as the simulator cut-off valve) SC. The stroke simulator SM allows the brake pedal BP to move when the master cut-off valve SE1 and the master cut-off valve SE2 are closed. In other words, the stroke simulator SM causes the amount of stroke of the brake pedal BP to correspond to the depression force or operation force applied to the brake pedal BP. The stroke simulator SM includes a cylinder in which is slidably positioned a piston PN3 to define a hydraulic pressure chamber PC3. A spring SP3 urges the piston PN3 in a direction which decreases the volume of the hydraulic pressure chamber PC3. The maximum stroke of the simulator SM is set to be smaller than a stroke which corresponds to a maximum amount of brake fluid stored in the second pressure chamber PC2. The simulator cut-off valve SC establishes and interrupts fluid communication between the second pressure chamber PC2 of the master cylinder MC and the stroke simulator SM.

A first master cylinder pressure sensor (hereinafter referred to as the first MC sensor) PM1 is connected to or operatively associated with the first pressure chamber PC1 of the master cylinder MC to determine the hydraulic pressure in the first pressure chamber PC1 of the master cylinder MC. A second master cylinder pressure sensor (hereinafter referred to as the second MC sensor) PM2 is connected to or operatively associated with the second pressure chamber PC2 of the master cylinder MC to determine the hydraulic pressure in the second pressure chamber PC2 of the master cylinder MC. In addition, the wheel brake Wfr is provided with a wheel cylinder pressure sensor (hereinafter referred to as the WC pressure sensor) for measuring the brake pressure in the wheel brake Wfr. The brake pedal BP is equipped with a stroke sensor ST for detecting the stroke or movement of the brake pedal BP. The first MC pressure sensor PM1, the second MC pressure sensor PM2, the WC pressure sensor PWfr, and the stroke sensor ST are electrically coupled to an electronic control device ECU which is in the form of a microcomputer.

As depicted in phantom line in FIG. 1, instead of the combination of the first MC pressure sensor PM1 and the second MC pressure sensor PM2, a depression force sensor DF can be provided to measure the force applied to the brake pedal BP upon depression. In addition, as an alternation to the pedal stroke sensor ST, a micro stroke sensor can be employed for measuring the stroke of either of the first piston PN1 and the second piston PN2.

The electronic control device ECU controls, based on signals received from the aforementioned sensors and other various sensors, the operation of the pressure increasing valve SIfr, the pressure decreasing valve SDfr, the master cut-off valves SE1, SE2, and the simulator cut-off valve SC. The electronic control device ECU, upon closure of the vehicle ignition switch, begins to execute a program of normal brake control, as shown in FIG. 2, at a cycle of 7 milliseconds.

Figure 2:
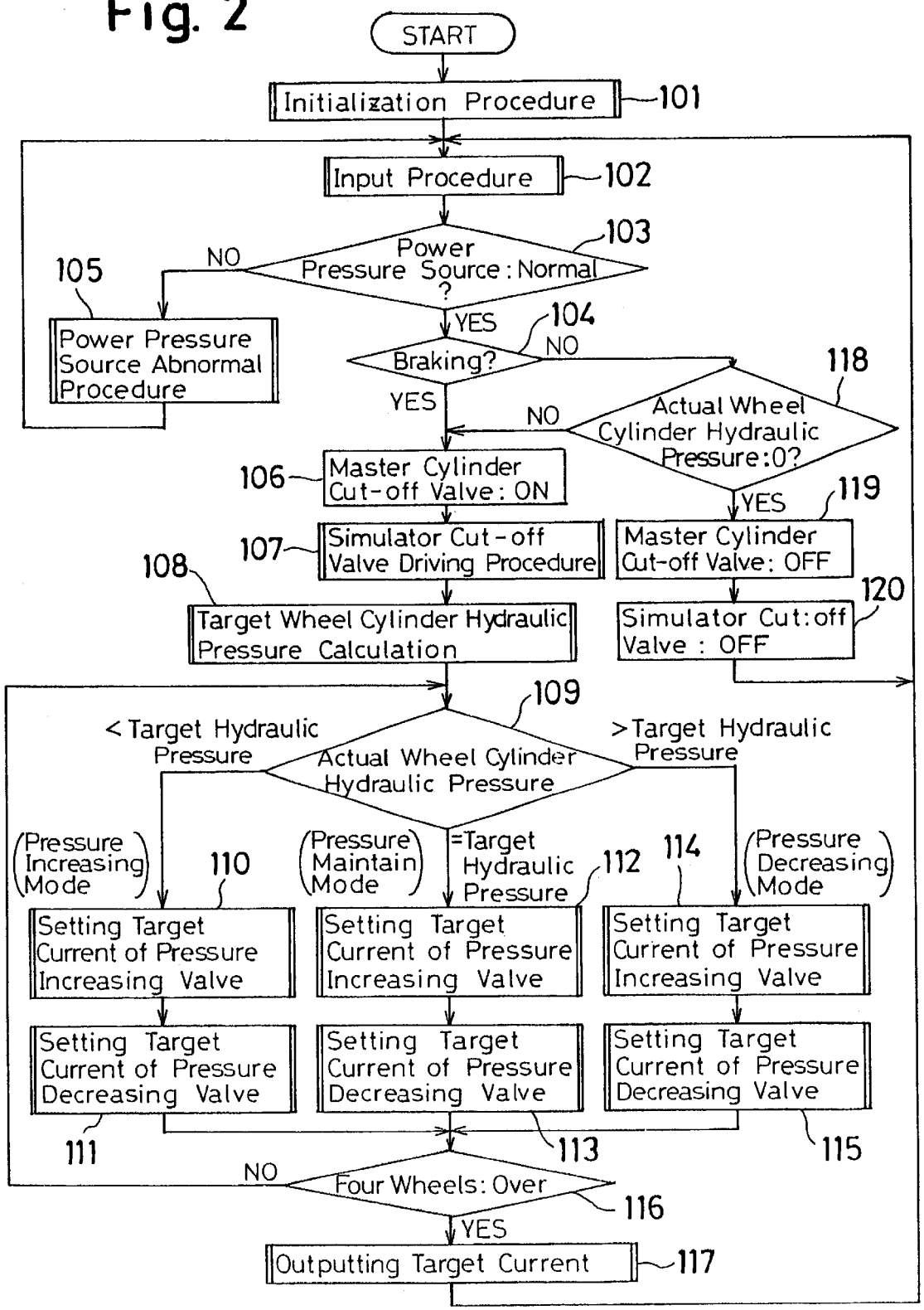
FIG. 2 is a flowchart illustrating the main routine program executed by the electronic control device of the hydraulic brake pressure control device shown in FIG. 1.

Referring to FIG. 2, initially at step 101, the electronic control device ECU is initialized. Next, at step 102, an input procedure for the detected signals is carried out with respect to each of the sensors PM1, PM2, PWfr, ST, etc. Then, at step 103, it is checked whether or not the pressure of the power pressure source is correct. If the result is yes, the control goes to step 104. Otherwise the control goes to step 105. At step 105, an abnormal procedure is performed. In detail, each of the master cut-off valves SE, SE2 is turned off so that they are open, the simulator cut-off valve SC is turned off so that it is closed, and the pressure increasing valve SIfr and the pressure decreasing valve SDfr are turned off so that they are closed. Thus, if the brake pedal BP is depressed, the first piston PN1 and the second piston PN2 of the master cylinder MC are correspondingly moved through a distance and the brake fluid under the resulting pressure in the first pressure chamber PC1 and the second pressure chamber PC2 is directly supplied to the wheel brakes such as the wheel brake Wfr.

At step 104, it is determined whether or not the brake pedal BP is depressed. If the result is yes, at step 106 the normally open master cut-off valves SE1, SE2 are turned on to be closed and at step 107 a procedure is executed for driving the simulator cut-off valve SC as will be described in detail later. Next, at step 108, a target wheel cylinder hydraulic pressure is calculated based on the larger of the pressures in the first pressure chamber PC1 and the second pressure chamber PC2 which were input-processed at step 102. At step 109, a comparison is made between the target wheel cylinder hydraulic pressure and an actual wheel cylinder hydraulic pressure which was derived from the input procedure at step 102. Depending on the comparison result, the hydraulic pressure mode is set to be one of a pressure-increase mode, a pressure-maintain mode, and a pressure decreasing mode. If the actual wheel cylinder hydraulic pressure is less than the target wheel cylinder hydraulic pressure, at step 110 a target current of the pressure increasing valve SIfr is set to a value for the pressure increasing mode and at step 111 a target current of the pressure decreasing valve SDfr is set to a value for the pressure increasing mode. If the actual wheel cylinder hydraulic pressure is equal to the target wheel cylinder hydraulic pressure, at step 112 a target current of the pressure increasing valve SIfr is set to a value for the pressure maintain mode and at step 113 a target current of the pressure decreasing valve SDfr is set to a value for the pressure maintain mode. Moreover, if the actual wheel cylinder hydraulic pressure is larger than the target wheel cylinder hydraulic pressure, at step 114 a target current of the pressure increasing valve SIfr is set to a value for the pressure decreasing mode and at step 115 a target current of the pressure decreasing valve SDfr is set to a value for the pressure decreasing mode.

After execution of steps 111, 113, 115, the program proceeds to step 116 at which it is determined whether or not all the wheels were subjected to the foregoing steps 109–115. If the result is no, the control proceeds to step 109. If the result in step 116 is yes, the program proceeds to step 117 at which the target currents are fed to the pressure increase valve and the pressure decreasing valve of each of the wheels. Thus, the brake hydraulic pressure of each of the wheels is controlled or regulated to a value corresponding to the operation or depression force of the brake pedal BP which is applied from a driver.

If it is determined at step 104 that the brake pedal BP is not depressed or operated, step 118 is executed to compare the actual wheel cylinder hydraulic pressure with zero (0). If the actual wheel cylinder hydraulic pressure is found to be zero (0), the program proceeds to step 119 at which the master cut-off valves SE1, SE2 are turned off to be opened. Then, at step 120, the simulator cut-off valve SC is turned off to be closed. If the actual wheel cylinder hydraulic pressure is found not to be zero (0) in step 118, the control proceeds to step 106 and the routine described above is carried out.

It is to be noted that as the control object, a vehicle lengthwise acceleration (deceleration) can be employed, instead of the wheel brake hydraulic pressure.

Figure 3:
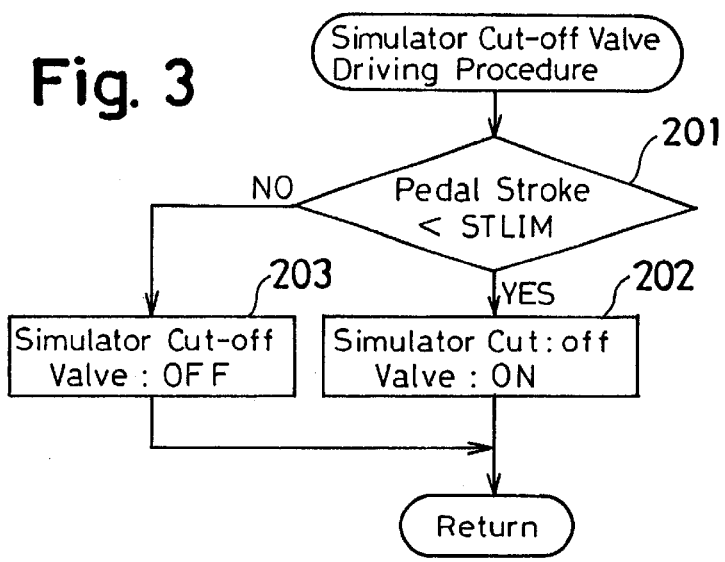
FIG. 3 is a flowchart illustrating the program that is carried out for controlling a first embodiment or example of a simulator cut-off valve driving procedure.

FIG. 3 shows a first example of the driving procedure for the simulator cut-off valve SC carried out in step 107 of FIG. 2. As shown in FIG. 3, at step 201, when the power pressure source is in the normal condition, the stroke of the brake pedal BP is compared with a predetermined stroke STLIM. The predetermined stroke STLIM is set to be slightly larger than the stroke of the brake pedal BP when the piston PN3 of the stroke simulator SM reaches its maximum stroke or slightly larger than the maximum stroke of the brake pedal BP when the first pressure chamber PC1 of the master cylinder MC which is not connected to the stroke simulator SM and the hydraulic pressure chamber PC3 of the stroke simulator SM are not in failure conditions, respectively. If the stroke of the brake pedal BP is equal to or less than the predetermined stroke STLIM, at step 202, the normally closed simulator cut-off valve SC is turned on to the open position, assuming or indicating that the hydraulic pressure chamber PC3 of the stroke simulator SM and the pressure chamber PC1 are not in failure or the seal members S2, S3 of the master cylinder MC and the seal member S5 of the stroke simulator SM are not broken. Then, the control returns to the main routine. On the other hand, if the stroke of the brake pedal BP is greater than the predetermined stroke STLIM, the program proceeds to step 203 at which the simulator cut-off valve SC is turned off to the closed position, assuming or indicating that at least one of the hydraulic pressure chamber PC3 of the stroke simulator SM and the pressure chamber PC1 is in failure or at least one of the seal members S2, S3 of the master cylinder MC and the seal member S5 of the stroke simulator SM has experienced a breakage. Then, the control returns to the main routine.

Figure 4:
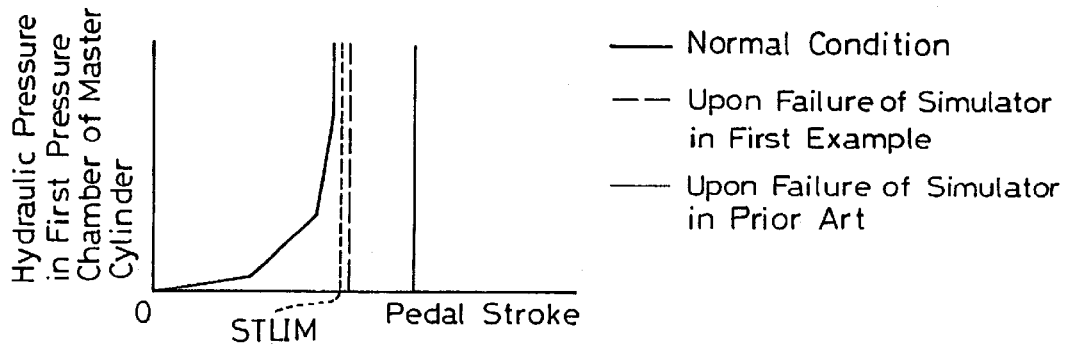
FIG. 4 is a graph illustrating the relationship between the brake pedal stroke and the hydraulic pressure in the first pressure chamber of the master cylinder when the simulator is in the normal condition and when the simulator is in failure in both the first example or embodiment of the present invention as well as in the known system of the prior art.

FIG. 4 illustrates the relationship between the brake pedal stroke and the master cylinder hydraulic pressure when the simulator SM is in failure in the first example or embodiment described above. As shown in FIG. 4, when the hydraulic pressure chamber PC3 of the stroke simulator SM is in the normal condition, the hydraulic pressure in the first pressure chamber PC1 is increased as the stroke of the brake pedal BP increases.

In contrast, with a failure of the hydraulic pressure chamber PC3 of the stroke simulator SM, the stroke of the brake pedal BP exceeds the predetermined stroke STLIM corresponding to the maximum stroke of the simulator SM, thereby closing the simulator cut-off valve SC. Thus, the hydraulic pressure in the first pressure chamber PC1 of the master cylinder MC increases rapidly or abruptly, which causes the hydraulic pressures in all the wheels such as the wheel Wfr to also increase rapidly or abruptly as a result of the execution of steps 108–117. Due to the fact that the maximum stroke of the of the simulator SM is set to be smaller than the stroke corresponding to the maximum amount of fluid stored in the second pressure chamber PC2 of the master cylinder MC, before the volume of the second pressure chamber PC2 of the master cylinder MC becomes zero (0), the master cylinder hydraulic pressure and the brake hydraulic pressures in all of the wheels is increase d rapidly.

This is to be contrasted with the know system of the prior art where, in the case of the failure of the stroke simulator SM, the simulator cut-off valve SC remains open so that the hydraulic pressure in the first pressure chamber PC1 of the master cylinder MC increases rapidly after the volume of the second pressure chamber PC2 of the master cylinder becomes zero (0).

Thus, with the first embodiment or example according to the present invention, as compared to the known system of the prior art, upon failure of the stroke simulator, an increase in the brake hydraulic pressure is achieved as rapidly as possible.

Figure 5:
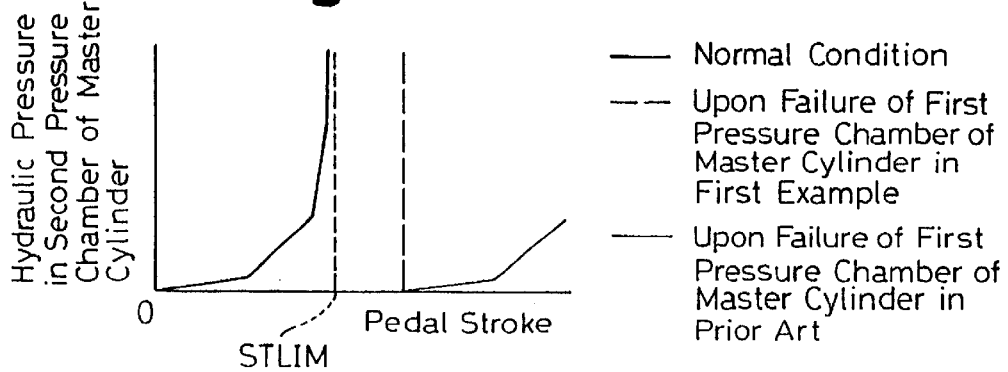
FIG. 5 is a graph illustrating the relationship between the brake pedal stroke and hydraulic pressure in the second pressure chamber of the master cylinder when the simulator is in the normal condition and when the simulator is in failure in both the first example or embodiment of the present invention as well as in the know system of the prior art.

FIG. 5 illustrates the relationship between the brake pedal stroke and the master cylinder hydraulic pressure when the first pressure chamber PC1 of the master cylinder MC is in failure in accordance with the first embodiment or example described above. As shown in FIG. 5, when the first pressure chamber PC1 of the master cylinder MC is in failure, the stroke of the brake pedal BP exceeds the predetermined stroke STLIM, thereby closing the simulator cut-off valve SC. Thus, immediately after engagement of the first piston PN1 with the second piston PN2 which results from movement of the first piston PN1 through the axial length of the first pressure chamber PC1, the hydraulic pressure in the second pressure chamber PC2 of the master cylinder MC increases rapidly with little stroke of the brake pedal BP, thus resulting in the hydraulic pressures in all of the wheel brakes increasing rapidly as a result of the execution of steps 108–117.

In contrast, in the known system of the prior art, when the first pressure chamber PC1 of the master cylinder MC is in failure, after engagement of the first piston PN1 of the master cylinder MC with the second piston PN2 which results from an advanced movement of the first piston PN1, the stroke of the brake pedal BP continues, which causes the hydraulic pressure in the second chamber PC2 of the master cylinder MC to increase gradually depending on the characteristics of the spring SP3 of the simulator SN, thereby increasing the brake hydraulic pressure in the wheels.

Thus, in the first embodiment or example of the present invention as compared to the known system, upon failure of the first pressure chamber PC1 of the master cylinder MC, an increase in the brake hydraulic pressure of each of the wheels is achieved as rapidly as possible immediately after engagement of the first piston PN1 of the master cylinder MC with the second piston PN2 resulting from the advancing movement of the first piston PN 1.

Figure 6:
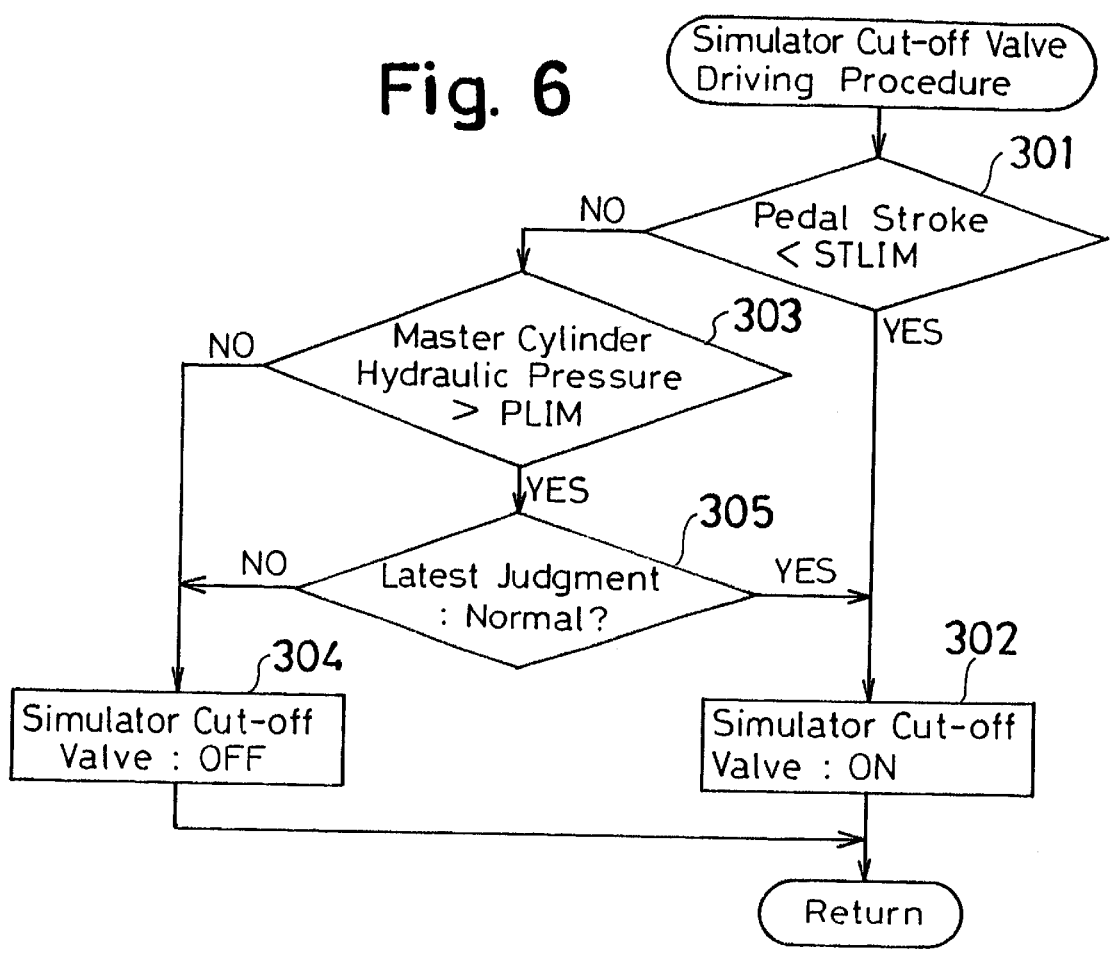
FIG. 6 is a flowchart illustrating the program for controlling a second embodiment or example of the simulator cut-off valve driving procedure.

FIG. 6 shows a second example or embodiment of the driving procedure of the simulator cut-off valve SC. As shown in FIG. 6, initially at step 301, the stroke of the brake pedal BP is compared with a predetermined stroke STLIM'. The predetermined stroke STLIM' is set to be smaller than the stroke of the brake pedal BP when the piston PN3 of the stroke simulator SM makes its full stroke or smaller than the maximum stroke of the brake pedal BP when the master cylinder MC and the stroke simulator SM are in the normal conditions. If the stroke of the brake pedal BP is less than the predetermined stroke STLIM', which means that the hydraulic pressure chamber PC3 of the stroke simulator SM and the first pressure chamber PC1 are in not failure, the program proceeds to step 302 at which the simulator cut-off valve SC is turned on to open.

On the other hand, if the brake pedal BP stroke is equal to or greater than the predetermined stroke STLIM', the program proceeds to step 303 at which the master cylinder hydraulic pressure (for example, the smaller of the hydraulic pressures in the first pressure chamber PC1 and the second pressure chamber PC2) is compared with a predetermined hydraulic pressure PLIM. The predetermined hydraulic pressure PLIM is set to be smaller than the master cylinder hydraulic pressure corresponding to the predetermined stroke STLIM' when the simulator SM and the master cylinder MC are not in failure. If the smaller of the hydraulic pressure in the first pressure chamber PC1 and the hydraulic pressure in the second pressure chamber PC2 is less than the predetermined hydraulic pressure PLIM, which means that at least one of the hydraulic pressure chamber PC3 of the stroke simulator SM and the first pressure chamber PC1 is in failure, the program proceeds to step 304 at which the simulator cut-off valve SC is turned off to be closed.

If the smaller of the hydraulic pressure in the first pressure chamber PC1 and the hydraulic pressure in the second pressure chamber PC2 is equal to or greater than the predetermined hydraulic pressure PLIM, the program proceeds to step 305 where it is determined whether or not in the latest execution of step 303 at least one of the hydraulic pressure chamber PC3 of the stroke simulator SM and the first pressure chamber PC1 is in failure. If it is determined that in the latest execution of step 303 at least one of the hydraulic pressure chamber PC3 of the stroke simulator SM and the first pressure chamber PC1 is not in failure, a judgment is made such that at present no failure is found. Then, at step 302, the simulator cut-off valve SC is turned on to be opened. On the other hand, if it is found that in the latest execution of step 303 at least one of the hydraulic pressure chamber PC3 of the stroke simulator SM and the first pressure chamber PC1 is in failure, a judgment is made that at present the failure remains. The program proceeds to step 304 at which the simulator cut-off valve SC is turned off to be closed.

Figure 7:
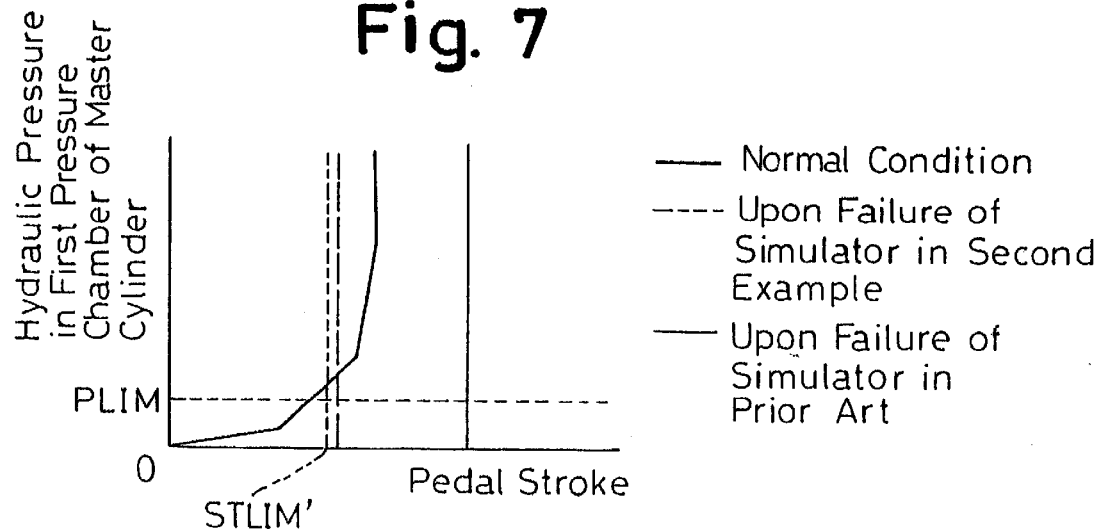
FIG. 7 is a graph illustrating the relationship between the brake pedal stroke and hydraulic pressure in the first pressure chamber of the master cylinder when the simulator is in the normal condition and when the simulator is in failure in both the second example or embodiment of the present invention as well as in the known system of the prior art.

FIG. 7 illustrates the relationship between the brake pedal stroke and the master cylinder hydraulic pressure in the second example or embodiment of the present invention. As shown in FIG. 7, when the hydraulic pressure chamber PC3 of the stroke simulator SM is in failure, the stroke of the brake pedal BP is in excess of the predetermined stroke STLIM' and the hydraulic pressure in, say, the first pressure chamber PC1 of the master cylinder MC becomes less than the predetermined hydraulic pressure PLIM, thereby closing the simulator cut-off valve SC. Thus, before the stroke of the stroke simulator SM becomes its maximum, it becomes possible to rapidly increase the hydraulic pressure in the first pressure chamber PC1 of the master cylinder MC and the hydraulic pressures of all the wheels, for example the wheel Wfr.

Thus, comparing the second example or embodiment of the present invention to the first example or embodiment, upon failure of the stroke simulator SM, it is possible to increase the brake hydraulic pressures in all of the wheels as rapidly as possible.

FIG. 8 shows a third embodiment or example of the driving procedure of the simulator cut-off valve SC. As shown in FIG. 8, initially at step 401, it is determined whether or not the latest judgment indicates that the stroke simulator SM and the master cylinder MC are not in failure (i.e., whether the stroke simulator SM is normal). If the result is yes, the program proceeds to step 402 at which the master cylinder hydraulic pressure (for example, the smaller of the hydraulic pressure in the first pressure chamber PC1 and the hydraulic pressure in the second pressure chamber PC2) corresponding to the stroke of the brake pedal BP is compared with a function f(P, St). The function f(P, St) is set to be slightly smaller than the characteristic function of the stroke of the brake pedal BP and the master cylinder hydraulic pressure. If the master cylinder hydraulic pressure relative to the brake pedal stroke is in excess of the function f(P, St) or falls in an area above the dotted line in FIG. 9, at step 403 the simulator cut-off valve SC is turned on to be opened, assuming that the hydraulic pressure chamber PC3 of the stroke simulator SM and the first pressure chamber PC1 of the master cylinder MC are not in failure.

On the other hand, if the master cylinder hydraulic pressure relative to the brake pedal stroke is less than the function f(P, St) or falls in an area below the dotted line in FIG. 9, the simulator out-off valve SC is turned off to be closed, assuming that at least one of the hydraulic pressure chamber PC3 of the stroke simulator SM and first pressure chamber PC1 of the master cylinder MC is in failure. If the result of step 401 reveals that at least one of the stroke simulator SM and the master cylinder MC is in failure in the latest judgment, it is judged that such the failure remains, and at step 404 the simulator cut-off valve SC is turned off to be closed.

FIG. 9 illustrates the relationship between the pedal stroke and the master cylinder hydraulic pressure in the third embodiment. As shown in FIG. 9, upon failure of the hydraulic pressure chamber PC3 of the simulator SM, the master cylinder hydraulic pressure relative to the brake pedal stroke is less than the function f(P, St), thereby closing the simulator cut-off valve SC. Thus, before the maximum stroke of the simulator SM is attained, it becomes possible to rapidly increase the hydraulic pressure in the first pressure chamber PC1 of the master cylinder MC and the hydraulic pressures of all of the wheels, for example the wheel Wfr.

Thus, with this third embodiment or example, when compared with the first example or embodiment, upon failure of the stroke simulator SM, it is possible to increase the brake hydraulic pressures in all of the wheels as rapidly as possible.

The principles, preferred embodiments or examples, and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention.

Accordingly, it is expressly intended that all such variations, changes and equivalents which fall within the spirit and scope of the present invention as defined in the claims be embraced thereby.

What is claimed is:

1. A brake pressure control device for automotive vehicles comprising:

a wheel brake operatively associated with a wheel of the automotive vehicle for applying a braking force to the wheel;

a master cylinder linked with a brake pedal;

a power pressure source separate from the master cylinder for generating a hydraulic pressure;

a hydraulic pressure control valve disposed between the power pressure source and the wheel brake to adjust a hydraulic pressure of the wheel brake using the hydraulic pressure generated by the power pressure source;

a first open/close valve which establishes and interrupts fluid communication between the master cylinder and the wheel brake;

a stroke simulator connected to the master cylinder to permit a stroke of the brake pedal when the first open/close valve is closed;

a second open/close valve which establishes and interrupts fluid communication between the master cylinder and the stroke simulator;

first detecting means for detecting an operation force of the brake pedal or hydraulic pressure generated by the master cylinder;

second detecting means for detecting the stroke of the brake pedal or a stroke of the master cylinder; and control means for controlling the hydraulic pressure control valve in response to a detection output of the first detection means by closing and opening the first open/close valve and the second open/close valve, respectively, when the power pressure source is in a normal condition, the control means closing the second open/close valve when the stroke of the brake pedal or the stroke of the master cylinder exceeds a predetermined stroke.

2. The brake pressure control device for automotive vehicles as set forth in claim 1, wherein the control means closes the second open/close valve when the stroke of the brake pedal or the stroke of the master cylinder exceeds a predetermined stroke and the operation force of the brake pedal or the hydraulic pressure generated by the master cylinder does not exceed a predetermined value.

3. The brake pressure control device for automotive vehicles as set forth in claim 1, wherein the control means closes the second open/close valve when the operation force of the brake pedal or the hydraulic pressure generated by the master cylinder relative to the stroke of the brake pedal or the stroke of the master cylinder, respectively, does not exceed a predetermined function.

4. A brake pressure control device for automotive vehicles comprising:

a wheel brake mounted at a wheel of the automotive vehicle for applying a braking force to the wheel;

a master cylinder linked with a brake pedal;

a power pressure source separate from the master cylinder for generating a hydraulic pressure;

a stroke simulator connected to the master cylinder;

first detecting means for detecting an operation force of the brake pedal or a hydraulic pressure generated by the master cylinder;

second detecting means for detecting the stroke of the brake pedal or a stroke of the master cylinder; and a hydraulic pressure control valve disposed between the power pressure source and the wheel brake to adjust hydraulic pressure of the wheel brake using the hydraulic pressure generated by the power pressure source, the hydraulic pressure control valve being controlled in response to a detection output of the first detecting means to interrupt fluid communication between the master cylinder and the wheel brake and establish fluid communication between the master cylinder and the stroke simulator when the power pressure source is in a normal condition, with fluid communication between the master cylinder and the stroke simulator being interrupted when the stroke of the brake pedal or the stroke of the master cylinder exceeds a predetermined stroke.

5. The brake pressure control device for automotive vehicles as set forth in claim 4, including an open/close valve which establishes and interrupts fluid communication between the master cylinder and the wheel brake.

6. The brake pressure control device for automotive vehicles as set forth in claim 5, including control means connected to the open/close valve for controlling opening and closing of the open/close valve.

7. The brake pressure control device for automotive vehicles as set forth in claim 4, including an open/close valve positioned between the master cylinder and the stroke simulator to establish and interrupt fluid communication between the master cylinder and the stroke simulator.

8. The brake pressure control device for automotive vehicles as set forth in claim 7, including control means connected to the open/close valve to close the open/close valve when the operation force of the brake pedal or the hydraulic pressure generated by the master cylinder relative to the stroke of the brake pedal or the stroke of the master cylinder, respectively, does not exceed a predetermined value.

9. The brake pressure control device for automotive vehicles as set forth in claim 7, including control means connected to the open/close valve to close the open/close valve when the stroke of the brake pedal or the stroke of the master cylinder exceeds a predetermined stroke and the operation force of the brake pedal or the hydraulic pressure generated by the master cylinder does not exceed a predetermined value.

* * * * *